(12) United States Patent
Schulz et al.

(10) Patent No.: US 12,448,025 B2
(45) Date of Patent: Oct. 21, 2025

(54) STEER-BY-WIRE STEERING COLUMN

(71) Applicant: Steering Solutions IP Holding Corporation, Saginaw, MI (US)

(72) Inventors: John F. Schulz, Hemlock, MI (US); Randy W. Jones, North Branch, MI (US); Michael P. Anspaugh, Bay City, MI (US); Sergio R. Molinar, Freeland, MI (US); Todd M. King, Saginaw, MI (US); Jacob A. Caverly, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/761,539

(22) Filed: Jul. 2, 2024

(65) Prior Publication Data

US 2025/0010906 A1 Jan. 9, 2025

Related U.S. Application Data

(60) Provisional application No. 63/525,067, filed on Jul. 5, 2023.

(51) Int. Cl.
*B62D 1/184* (2006.01)
*B62D 1/187* (2006.01)
(Continued)

(52) U.S. Cl.
CPC ........... *B62D 1/19* (2013.01); *B62D 15/0215* (2013.01)

(58) Field of Classification Search
CPC .... B60G 2800/963; B62D 1/184; B62D 1/19; B62D 1/192; B62D 5/001; B62D 5/005;
(Continued)

(56) References Cited

U.S. PATENT DOCUMENTS

| 11,117,610 B2 * | 9/2021 | Bayer ..................... F16D 3/065 |
| 2002/0189888 A1 * | 12/2002 | Magnus ................. B62D 5/006 |
| | | 180/443 |

(Continued)

FOREIGN PATENT DOCUMENTS

| DE | 10033810 A1 * | 1/2002 | ............. B62D 1/185 |
| DE | 60206436 T2 | 6/2006 | |

(Continued)

OTHER PUBLICATIONS

Description translation for DE 102023100870 from Espacenet (Year: 2023).*

(Continued)

*Primary Examiner* — Jason D Shanske
*Assistant Examiner* — Daniel M. Keck
(74) *Attorney, Agent, or Firm* — Dickinson Wright PLLC

(57) ABSTRACT

A steer-by-wire steering column includes a single column jacket extending in a longitudinal direction. The steering column also includes a single steering shaft extending in the longitudinal direction and housed at least partially within the single column jacket. The steering column further includes a steer-by-wire electric actuator at least partially disposed within the single column jacket and surrounding the single steering shaft to provide resistance to the single steering shaft.

18 Claims, 5 Drawing Sheets

(51) Int. Cl.
    *B62D 1/19*           (2006.01)
    *B62D 5/00*           (2006.01)
    *B62D 5/04*           (2006.01)
    *B62D 15/02*          (2006.01)

(58) Field of Classification Search
    CPC ... B62D 5/006; B62D 15/021; B62D 15/0215
    USPC .......................................................... 74/492
    See application file for complete search history.

(56) References Cited

U.S. PATENT DOCUMENTS

| | | | | |
|---|---|---|---|---|
| 2003/0127274 | A1* | 7/2003 | Dominke | B60R 25/0211 |
| | | | | 180/402 |
| 2004/0035238 | A1* | 2/2004 | Jolley | B62D 1/184 |
| | | | | 74/493 |
| 2008/0185830 | A1* | 8/2008 | Ridgway | B62D 1/195 |
| | | | | 292/1.5 |
| 2008/0217901 | A1* | 9/2008 | Olgren | B62D 1/195 |
| | | | | 280/775 |
| 2013/0220725 | A1* | 8/2013 | Ishihara | B62D 5/001 |
| | | | | 180/402 |
| 2018/0154925 | A1* | 6/2018 | Steinkogler | F16D 27/108 |
| 2020/0406952 | A1* | 12/2020 | Gosztyla | B62D 1/184 |
| 2021/0070361 | A1* | 3/2021 | Erickson | B62D 15/0235 |
| 2022/0153339 | A1* | 5/2022 | Kim | H02P 21/22 |

FOREIGN PATENT DOCUMENTS

| | | | | |
|---|---|---|---|---|
| DE | 102009017054 | A1 | 10/2010 | |
| DE | 102018121610 | A1 | 3/2020 | |
| DE | 112018006231 | T5 | 9/2020 | |
| DE | 102021207887 | B3 * | 2/2022 | ............. B62D 1/184 |
| DE | 102021204136 | B3 * | 4/2022 | ............... B62D 1/04 |
| DE | 102022103079 | A1 * | 8/2022 | ............... B62D 1/16 |
| DE | 102021210241 | A1 | 3/2023 | |
| DE | 102022133149 | A1 | 6/2023 | |
| DE | 102023100870 | A1 * | 7/2024 | |
| EP | 1547901 | A1 * | 6/2005 | ............. B62D 1/189 |
| JP | 6220608 | B2 * | 10/2017 | |

OTHER PUBLICATIONS

Description translation for EP 1547901 from Espacenet (Year: 2005).*

Office Action regarding corresponding DE App. No. 10 2024 118 904.5; issued May 26, 2025.

* cited by examiner

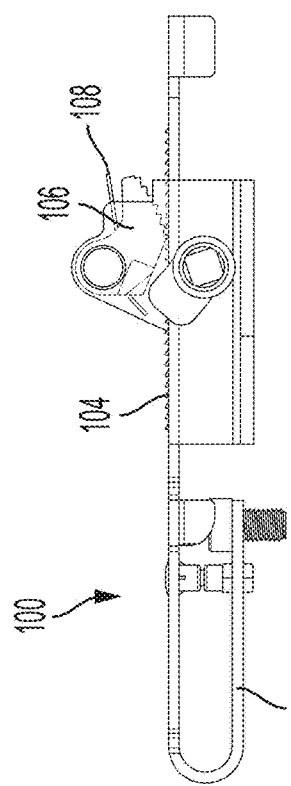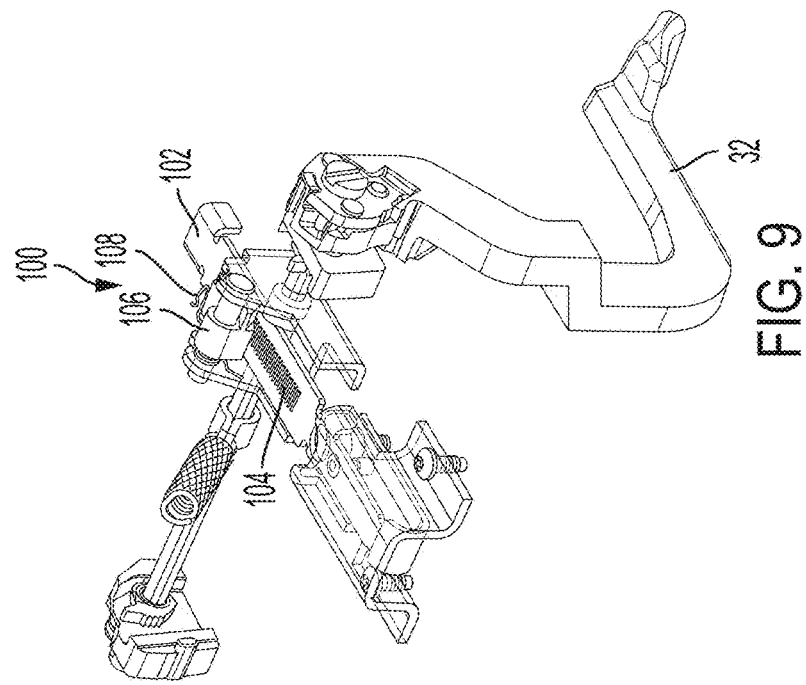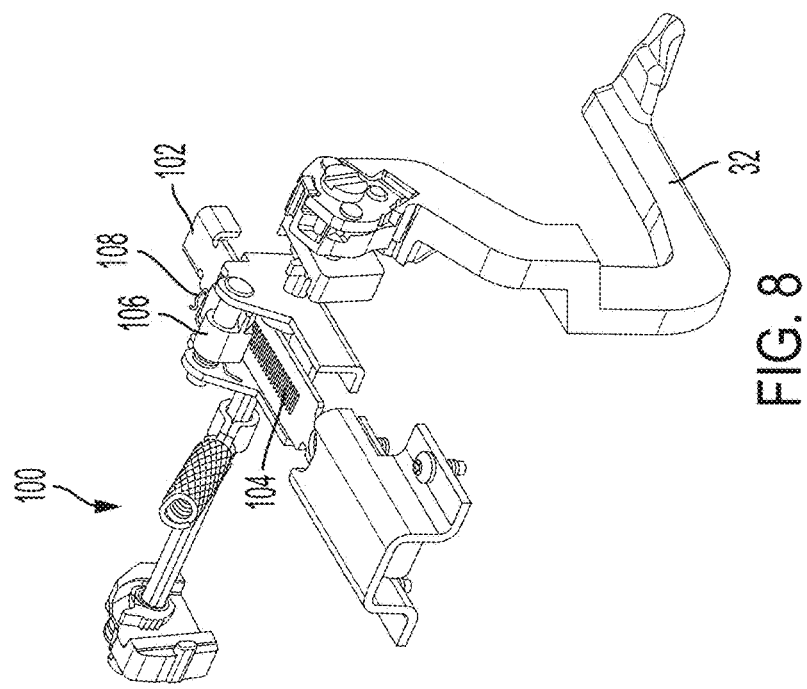

STEER-BY-WIRE STEERING COLUMN

CROSS-REFERENCE TO RELATED APPLICATION

This application claims the benefits of priority to U.S. Provisional Patent Application Ser. No. 63/525,067, filed Jul. 5, 2023, the disclosure of which is incorporated by reference herein in its entirety.

TECHNICAL FIELD

This disclosure relates to vehicle steering systems and, more particularly, to a steer-by-wire steering column.

BACKGROUND

A vehicle, such as a car, truck, sport utility vehicle, crossover, mini-van, marine craft, aircraft, all-terrain vehicle, recreational vehicle, or other suitable vehicles, typically include a steering system having a steering column. For many years, steering columns included one or more jacket housings which contain a steering shaft assembly that physically connected to a rack or other device that manipulated the road wheels. Advancements in electric technology have led to developments that eliminate the continuous physical connection between the steering input device and the road wheels. One such steering system is referred to as a steer-by-wire steering system. Another electric system is referred to as electric powered steering (EPS), with the power provided at the column or the rack, for example.

Prior steering systems, whether steer-by-wire or otherwise, which include manual rake and axial control require two or more jackets and two or more steering shafts (e.g., upper and lower jackets and shafts). As with any system, it is typically advantageous to reduce the number of components and complexity of the system.

In addition to the number of components required by prior steering columns for systems of the steer-by-wire type, the hand wheel actuator which provides resistance, feedback and assistance to a steering shaft is often assembled to the steering column at an angle or even perpendicular to the longitudinal axis of the steering column, thereby requiring additional space and complicating overall packaging efforts.

SUMMARY OF THE DISCLOSURE

According to one aspect of the disclosure, a steer-by-wire steering column includes a single column jacket extending in a longitudinal direction. The steering column also includes a single steering shaft extending in the longitudinal direction and housed at least partially within the single column jacket. The steering column further includes a steer-by-wire electric actuator at least partially disposed within the single column jacket and surrounding the single steering shaft to provide resistance to the single steering shaft.

According to another aspect of the disclosure, a steer-by-wire steering column includes a single column jacket extending in a longitudinal direction, wherein the single column jacket defines a first pair of slots for receiving an adjustment post of a manual adjustment assembly therethrough, wherein a first position of the adjustment post within the first pair of slots defines a full axial in position of the single column jacket and the single steering shaft and a second position of the adjustment post within the first pair of slots defines a full axial out position of the single column jacket and the single steering shaft. The steering column also includes a single steering shaft extending in the longitudinal direction and housed at least partially within the single column jacket. The steering column further includes a steer-by-wire electric actuator at least partially disposed within the single column jacket and surrounding the single steering shaft to provide resistance to the single steering shaft. The steer-by-wire electric actuator includes a rotor structure operatively coupled to a radially outer surface of the single steering shaft. The electric actuator also includes a motor stator at least partially surrounding the rotor structure. The steering column also includes a housing end structure operatively coupled to an open end of the single column jacket, wherein the housing end structure defines a second pair of slots for receiving at least one component extending from a vehicle structure that the single column jacket and the housing end structure move relative to, wherein a first position of the at least one component within the second pair of slots defines the full axial in position of the single column jacket and the single steering shaft and a second position of the at least one component within the second pair of slots defines a full axial out position of the single column jacket and the single steering shaft.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a side elevation view of an energy absorption strap assembly for the steer-by-wire steering column;

FIG. 8 is a perspective view of the energy absorption strap assembly; and

FIG. 9 is a perspective, partially transparent view of the energy absorption strap assembly.

DETAILED DESCRIPTION

The following discussion is directed to various embodiments of the disclosure. The embodiments disclosed herein should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to intimate that the scope of the disclosure, including the claims, is limited to that embodiment.

The embodiments disclosed herein may benefit various types of steering systems in a vehicle, such as a car, truck, sport utility vehicle, crossover, mini-van, marine craft, aircraft, all-terrain vehicle, recreational vehicle, or other suitable vehicle. In particular, the embodiments relate to a steer-by-wire steering column with manual adjustment capability, where the steering column advantageously eliminates steering column parts when compared to a traditional steering column, which typically requires two or more jackets and two or more steering shaft components.

Figure 1:
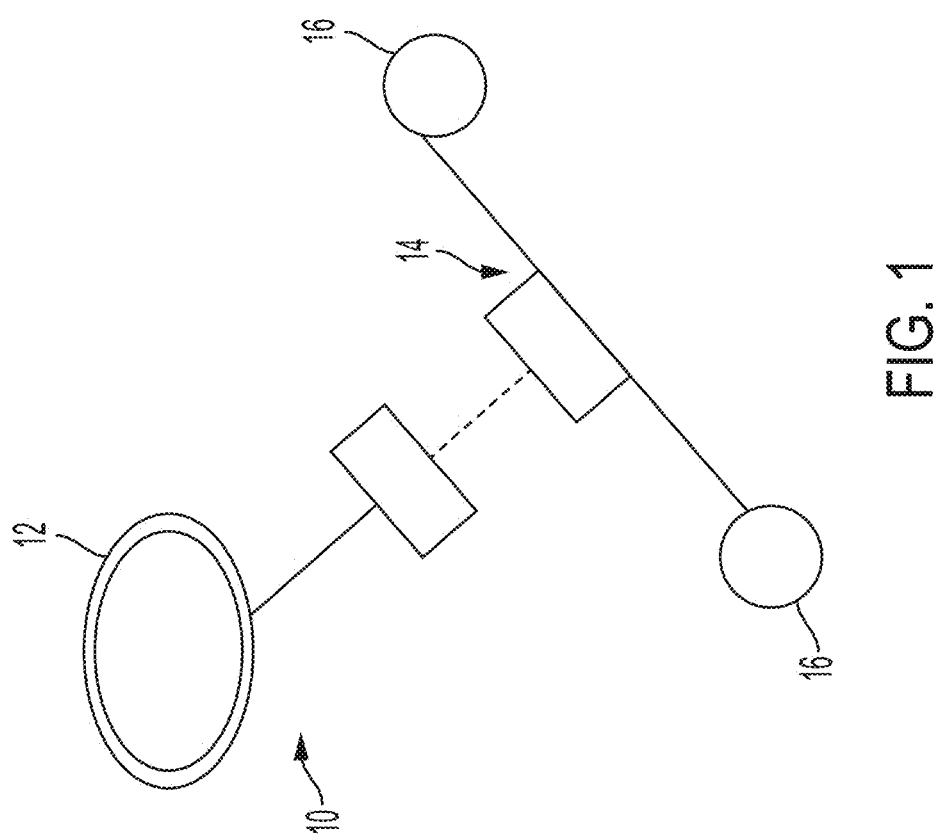
FIG. 1 is schematically illustrates a vehicle steering system.

Referring to FIG. 1, the steering column assembly is generally referenced with numeral 10. The steering column assembly includes a steering wheel 12, wherein a driver may provide a steering input by turning the steering wheel 12. The steering column assembly 10 is a steer-by-wire type of steering system. Therefore, the steering column assembly 10 does not include a continuous mechanical connection between the steering wheel 12 and an output gear and rack 14 which causes physical adjustment of road wheels 16 for steering maneuvers. Even in prior steer-by-wire systems, multiple steering shafts and/or multiple steering column jackets have been required to operatively couple the steering wheel 12 to another component, such as an actuator or the like. However, the embodiments disclosed herein reduce the number of primary components required by the steering column assembly 10.

Figure 3:
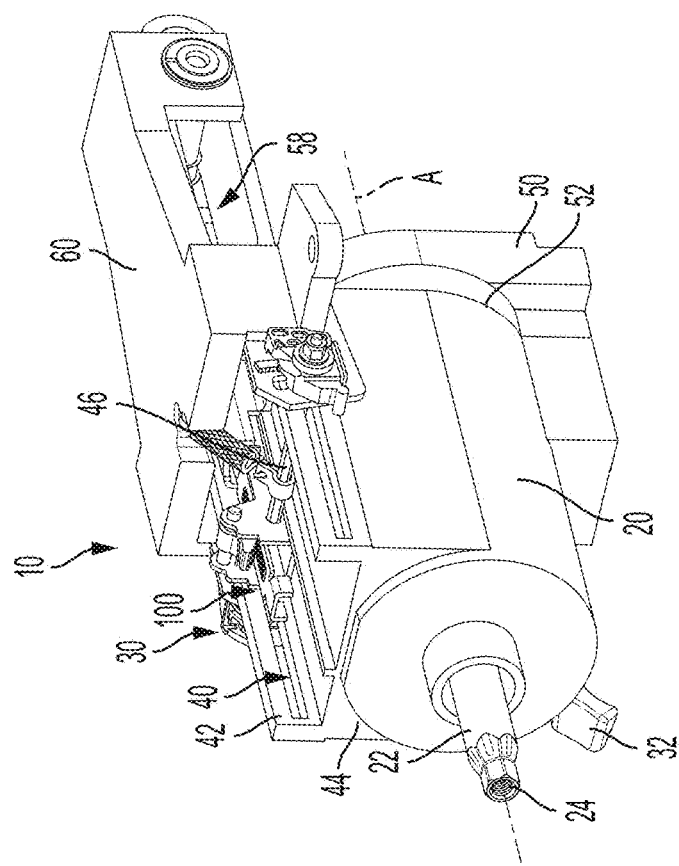
FIG. 3 is a second perspective view of the steer-by-wire steering column.
Figure 2:
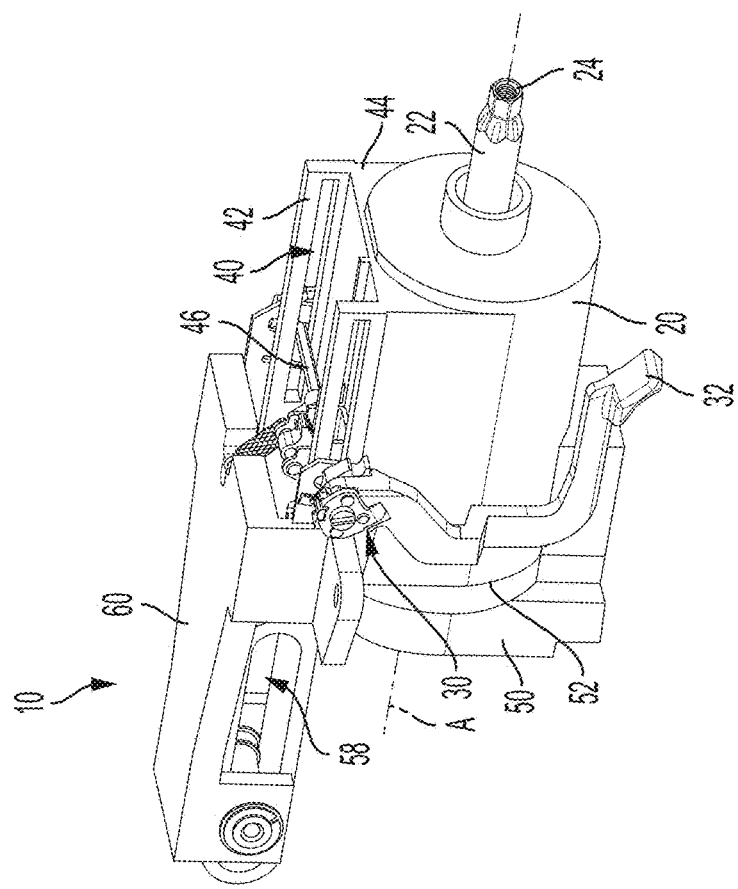
FIG. 2 is a first perspective view of a steer-by-wire steering column.

Referring now to FIGS. 2 and 3, the steer-by-wire steering column assembly 10 is shown in more detail. The steer-by-wire steering column assembly 10 is manually adjustable and includes a single steering column jacket 20 which at least partially houses a single steering shaft 22. Therefore, it is to be appreciated that the overall steering column jacket assembly is limited to the single jacket 20 and that the single jacket 20 houses at least a portion of the single steering shaft 22. Therefore, the overall steering shaft assembly is limited to a single steering shaft 22 and is not an assembled plurality of segments forming the steering shaft assembly. The single steering shaft 22 has an end 24 extending out of the single jacket 20 in a generally rearward direction of the vehicle. The end 24 protruding out of the single jacket 20 is configured to have a steering input device—such as a steering wheel—operatively coupled thereto.

The steer-by-wire steering column assembly 10 also includes a manual adjustment assembly 30 which provides a user the ability to manually adjust an axial and/or rake position of the steer-by-wire steering column assembly 10. The term "axial" movement refers to movement of the single jacket 20 in a direction substantially parallel to a longitudinal axis A of the steer-by-wire steering column assembly 10. The term "rake" movement refers to movement of the single jacket 20 in a substantially upward and downward direction, relative to the longitudinal axis A of the steer-by-wire steering column assembly 10. The manual adjustment assembly 30 includes an adjustment lever 32. Upon rotation of the adjustment lever 32, one or more cams 34 and/or other components move to an unlocked position which allows all or a portion of the steer-by-wire steering column assembly 10 to be manually adjusted.

Figure 5:
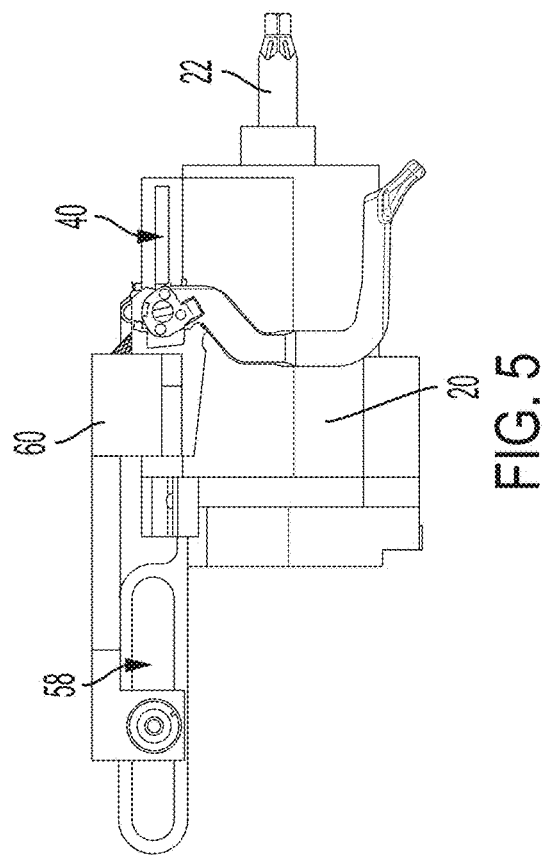
FIG. 5 is a side, elevation view of the steer-by-wire steering column in a full axial in position.
Figure 4:
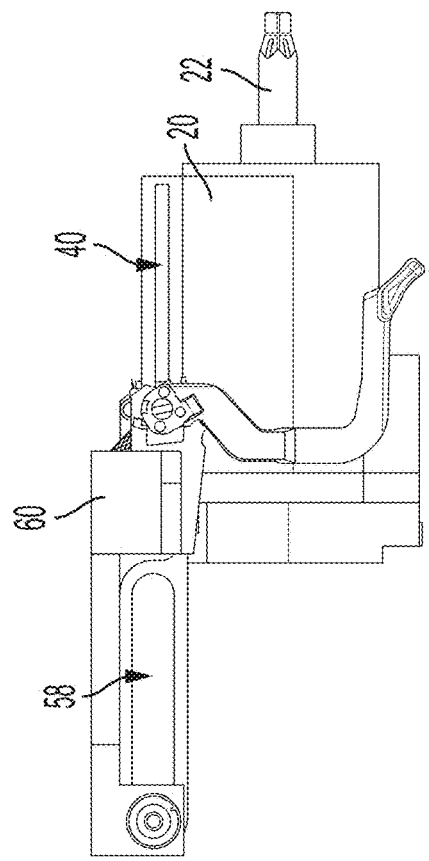
FIG. 4 is a side, elevation view of the steer-by-wire steering column in a full axial out position.

The single jacket 20 defines a pair of slots 40 extending generally in a longitudinal direction of the steer-by-wire steering column assembly 10. The pair of slots 40 may be defined within a pair of rails 42 protruding from the main body 44 of the single jacket 20, as illustrated. The pair of slots 40 allow an adjustment post 46 to extend through each of the slots 40 and connect to components of the manual adjustment assembly 30. During axial movement of the single jacket 20, the adjustment post 46 slides within the slots 40 between a full axial "out" position (FIG. 4) and a full axial "in" position (FIG. 5). The full axial out position corresponds to a rearmost position in a vehicle direction (i.e., closest position to operator). The full axial in position corresponds to a most forward position in a vehicle direction (i.e., farthest position from operator).

Figure 6:
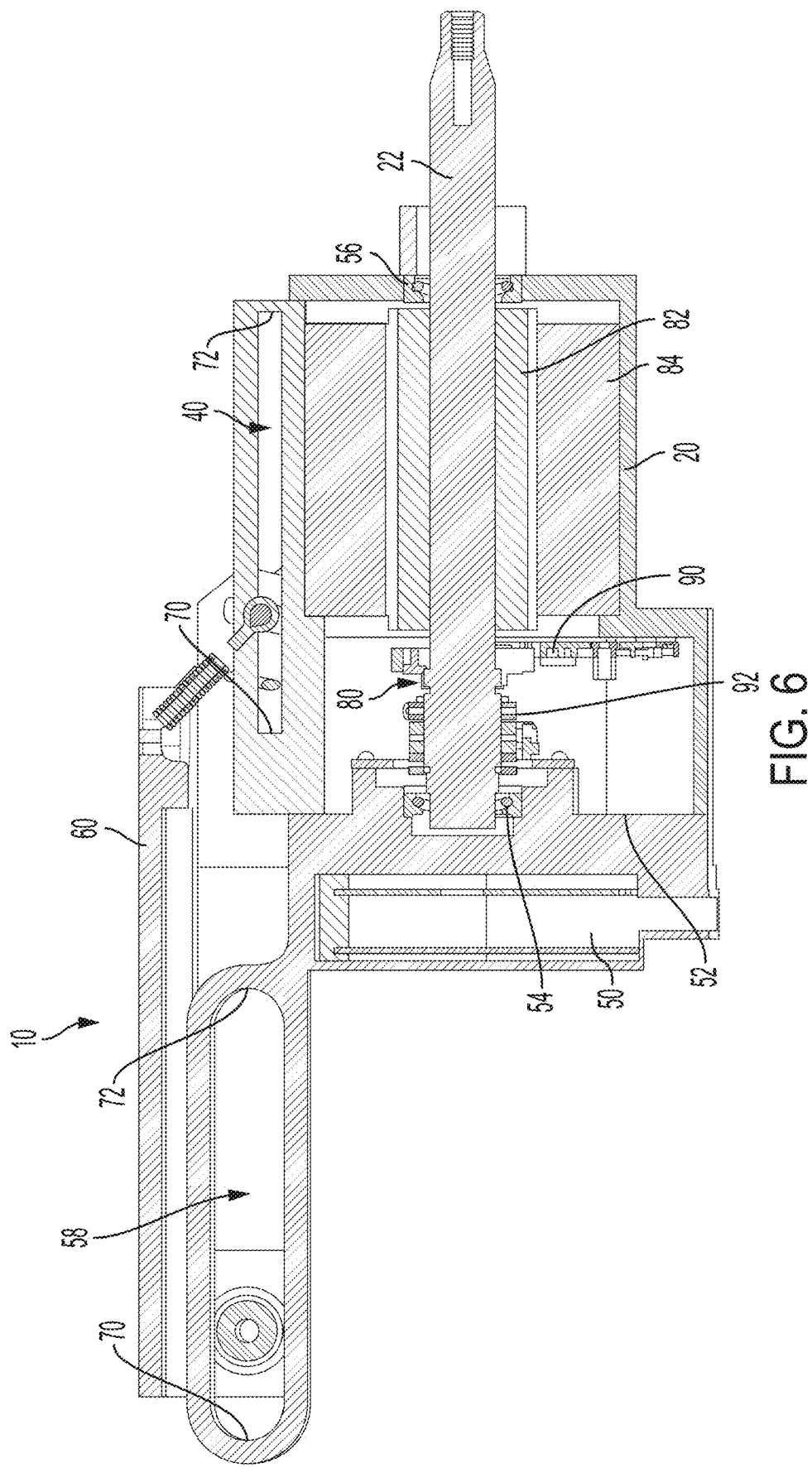
FIG. 6 is a side, elevation, cross-sectional view of the steer-by-wire steering column.

Referring now to FIG. 6, with continued reference to FIGS. 2-5, the steer-by-wire steering column assembly 10 also includes a housing end structure 50 which is operatively coupled to the single jacket 20. The housing end structure 50 is attached to an open end 52 of the single jacket 20 to close the single jacket 20 and to provide a location to mount a lower bearing 54. In some embodiments, the lower bearing 54 is pressed into the housing end structure 50. The single steering shaft 22 is held by the lower bearing 54 and an upper bearing 56. In the illustrated perspective, the lower bearing 54 is on the left side of the single steering shaft 22 and the upper bearing 56 is on the right side of the single steering shaft 22. Retaining the single steering shaft 22 by two bearings provides a stable structure for creating a stiff steering column design assembly.

The housing end structure 50 defines a pair of slots 58. The pair of slots 58 allow for operative coupling between the housing end structure 50 and a vehicle structure 60, such as a mounting bracket, for example. Components extending from the vehicle structure 60 extend through each of the slots 58. As with the adjustment post 46 in the slots 40 of the single jacket 20, the components of the vehicle structure 60 slide within the slots 58 of the housing end structure 50 between a full axial out position (FIG. 4) and a full axial in position (FIG. 5) during axial movement of the steer-by-wire steering column assembly 10. As shown, the full axial in position leaves room between the elements (i.e., components and adjustment post) disposed within the slots 40, 58 and respective ends of the slots 70, 72, as shown well in FIG. 5. In other words, the full axial out position of the adjustment post 46 is located at or proximate to—a first end of the first pair of slots 48 and the full axial in position of the adjustment post 46 is located spaced from a second end of the first pair of slots 48. Similarly, the full axial out position of the at least one component within the second pair of slots 58 is located at or proximate to—a first end of the second pair of slots 50 and the full axial in position of the at least one component is located spaced from a second end of the second pair of slots 50. This provides space for the steer-by-wire steering column assembly 10, particularly the single jacket 20 and coupled components, to go through a crash stroke range. The crash stroke range allows for energy absorption during an impact event.

FIG. 6 is a partial cross-sectional view illustrating an interior cavity 80 of the single jacket 20. One or more magnets forming a rotor structure assembly 82 are mounted to a radially outer surface of the single steering shaft 22. Copper windings of a motor stator 84 are mounted to an interior wall 86 of the single jacket 20 and do not rotate. The motor stator 84 at least partially surrounds the rotor structure assembly 82. The magnets of the rotor assembly 82 rotate with the single steering shaft 22. The overall steer-by-wire electric device (e.g., motor plus additional components) may be referred to as an "emulator". The emulator resists turning the single steering shaft 22 to provide steering feedback to the driver and assists with steering inputs to adjust effort required by the driver. The emulator is mounted in a manner in which the emulator directly surrounds the single steering shaft 22 to eliminate the need for a gear box by utilizing a direct drive system. The assembly also includes one or more rotation position sensors 90 to detect the angular rotational position of the single steering shaft 22 and one or more travel stop limiters 92 to define rotational travel limits for movement of the single steering shaft 22. It is noted that the motor stator 84 and the single jacket 20 remain rotationally stationary relative to the single steering shaft 22 during operation.

FIGS. 7-9 illustrate an energy absorption assembly 100 for the steer-by-wire steering column assembly 10. The energy absorption assembly 100 includes an energy absorption strap 102 coupled to an outer surface of the single column jacket 20 and having a plurality of teeth 104. The energy absorption assembly 100 also includes a pivotable member 106 having one or more teeth engageable with the teeth 104 of the energy absorption strap 102 to move the energy absorption assembly 100 between an engaged and disengaged condition by selectively moving the at least one tooth of the pivotable member 106 into and out of engagement with the plurality of teeth 104 of the energy absorption strap 102. The pivotable member 106 is pivoted in response to movement of the manual adjustment lever 32. During axial and/or rake adjustment of the steer-by-wire steering column assembly 10, the energy absorption assembly 100 is in the disengaged condition, but when the manual adjustment assembly 30 is locked, the energy absorption assembly 100 is engaged and prepared for energy absorption.

The energy absorption assembly 100 includes a biasing member 108, such as a spring, connected to the adjustment post 46 of the manual adjustment assembly 30. The biasing member 108 is also connected to the pivotable member 106 of the energy absorption assembly 100. The biasing member 108 biases the pivotable member 106 towards the engaged condition, such that its teeth are engaged with the teeth 104 of the energy absorption strap 102. However, rotation of the adjustment post 46 with the adjustment lever 32 overcomes the biasing force of the biasing member 108 to pivot the pivotable member 106 to the disengaged condition.

The embodiments disclosed herein provide a steer-by-wire steering column assembly 10 having a simplified design, in terms of the number of components, and integrates the actuator and actuator housing with the steering column. This allows the entire system to axially translate together during adjustment thereof in a compact package, while still permitting energy absorption capability.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. A steer-by-wire steering column comprising:
    a single column jacket extending in a longitudinal direction;
    a single steering shaft extending in the longitudinal direction and housed at least partially within the single column jacket;
    a steer-by-wire electric actuator at least partially disposed within the single column jacket and surrounding the single steering shaft to provide resistance to the single steering shaft; and
    a housing end structure operatively coupled to an open end of the single column jacket, wherein the housing end structure defines a second pair of slots for receiving at least one component extending from a vehicle structure that the single column jacket and the housing end structure move relative to.

2. The steer-by-wire steering column of claim 1, wherein the single column jacket defines a first pair of slots for receiving an adjustment post of a manual adjustment assembly therethrough.

3. The steer-by-wire steering column of claim 2, wherein a first position of the adjustment post within the first pair of slots defines a full axial in position of the single column jacket and the single steering shaft and a second position of the adjustment post within the first pair of slots defines a full axial out position of the single column jacket and the single steering shaft.

4. The steer-by-wire steering column of claim 3, wherein the second position of the adjustment post is located at a first end of the first pair of slots and the first position of the adjustment post is located spaced from a second end of the first pair of slots.

5. The steer-by-wire steering column of claim 1, wherein a first position of the at least one component within the second pair of slots defines a full axial in position of the single column jacket and the single steering shaft and a second position of the at least one component within the second pair of slots defines a full axial out position of the single column jacket and the single steering shaft.

6. The steer-by-wire steering column of claim 5, wherein the second position of the at least one component is located at a first end of the second pair of slots and the first position of the at least one component is located spaced from a second end of the second pair of slots.

7. The steer-by-wire steering column of claim 1, further comprising an energy absorption assembly, wherein the energy absorption assembly comprises:
    an energy absorption strap coupled to an outer surface of the single column jacket, the energy absorption strap having a plurality of teeth on a surface thereof; and
    a pivotable member having at least one tooth, the pivotable member pivotable to selectively move the at least one tooth of the pivotable member into and out of engagement with the plurality of teeth of the energy absorption strap.

8. The steer-by-wire steering column of claim 7, wherein the pivotable member of the energy absorption assembly is pivoted in response to movement of a manual adjustment lever.

9. The steer-by-wire steering column of claim 1, further comprising a rotation position sensor disposed within the single column jacket to detect an angular rotational position of the single steering shaft.

10. The steer-by-wire steering column of claim 1, further comprising at least one travel stop limiter disposed within the single column jacket to define a rotational limit for the single steering shaft in at least one rotational direction.

11. The steer-by-wire steering column of claim 1, wherein the steer-by-wire electric actuator comprises:

a rotor structure operatively coupled to a radially outer surface of the single steering shaft; and a motor stator at least partially surrounding the rotor structure.

12. A steer-by-wire steering column comprising:

a single column jacket extending in a longitudinal direction, wherein the single column jacket defines a first pair of slots for receiving an adjustment post of a manual adjustment assembly therethrough, wherein a first position of the adjustment post within the first pair of slots defines a full axial in position of a single column jacket and the single steering shaft and a second position of the adjustment post within the first pair of slots defines a full axial out position of the single column jacket and the single steering shaft;

the single steering shaft extending in the longitudinal direction and housed at least partially within the single column jacket;

a steer-by-wire electric actuator at least partially disposed within the single column jacket and surrounding the single steering shaft to provide resistance to the single steering shaft, wherein the steer-by-wire electric actuator comprises:

a rotor structure operatively coupled to a radially outer surface of the single steering shaft; and a motor stator at least partially surrounding the rotor structure; and a housing end structure operatively coupled to an open end of the single column jacket, wherein the housing end structure defines a second pair of slots for receiving at least one component extending from a vehicle structure that the single column jacket and the housing end structure move relative to, wherein a first position of the at least one component within the second pair of slots defines the full axial in position of the single column jacket and the single steering shaft and a second position of the at least one component within the second pair of slots defines a full axial out position of the single column jacket and the single steering shaft.

13. The steer-by-wire steering column of claim 12, wherein the second position of the adjustment post is located at a first end of the first pair of slots and the first position of the adjustment post is located spaced from a second end of the first pair of slots.

14. The steer-by-wire steering column of claim 12, wherein the second position of the at least one component is located at a first end of the second pair of slots and the first position of the at least one component is located spaced from a second end of the second pair of slots.

15. The steer-by-wire steering column of claim 12, further comprising an energy absorption assembly, wherein the energy absorption assembly comprises:

an energy absorption strap coupled to an outer surface of the single column jacket, the energy absorption strap having a plurality of teeth on a surface thereof; and a pivotable member having at least one tooth, the pivotable member pivotable to selectively move the at least one tooth of the pivotable member into and out of engagement with the plurality of teeth of the energy absorption strap.

16. The steer-by-wire steering column of claim 15, wherein the pivotable member of the energy absorption assembly is pivoted in response to movement of a manual adjustment lever.

17. The steer-by-wire steering column of claim 12, further comprising a rotation position sensor disposed within the single column jacket to detect an angular rotational position of the single steering shaft.

18. The steer-by-wire steering column of claim 12, further comprising at least one travel stop limiter disposed within the single column jacket to define a rotational limit for the single steering shaft in at least one rotational direction.

* * * * *